No. 777,128. PATENTED DEC. 13, 1904.
A. NELSON.
TRANSFER TABLE.
APPLICATION FILED MAR. 9, 1904.
NO MODEL.
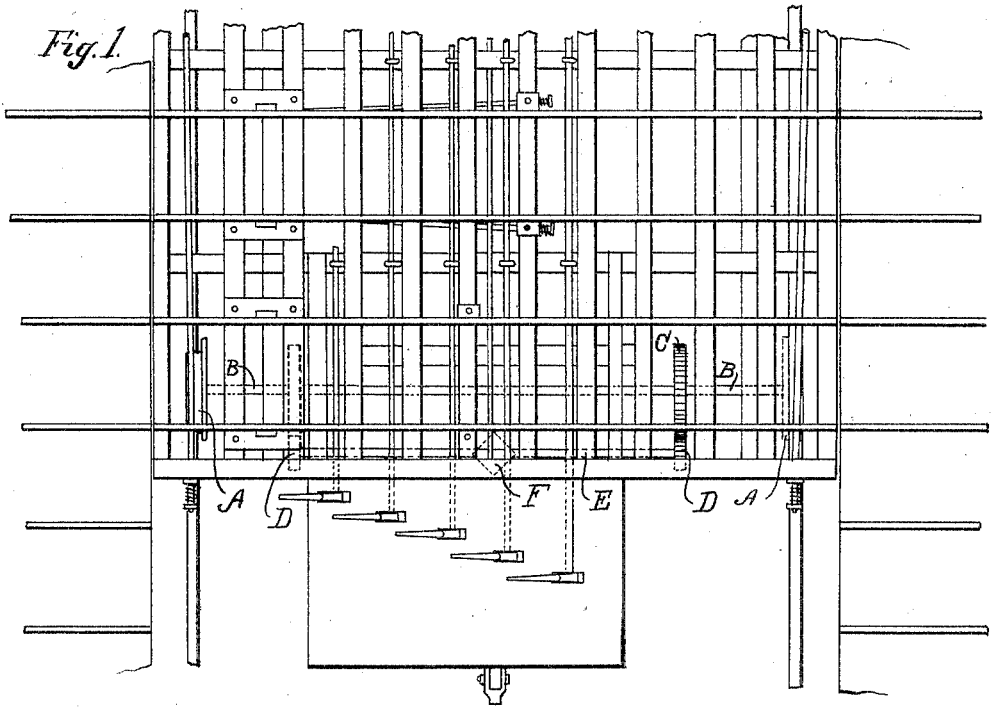
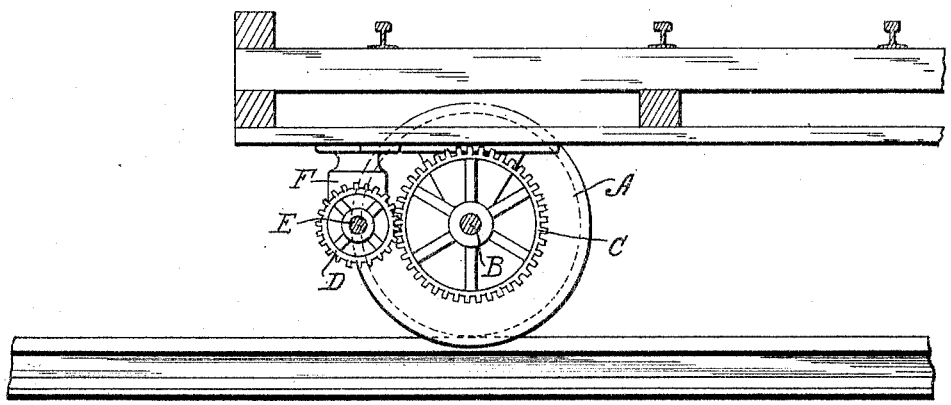
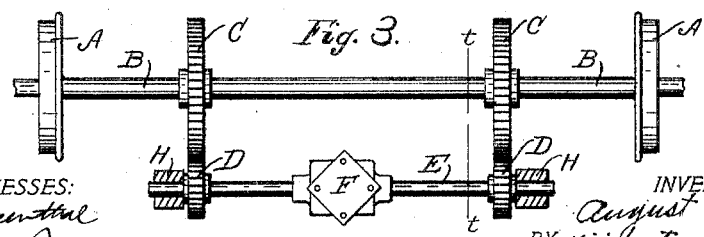
WITNESSES: INVENTOR
August Nelson
BY Livingston A. Thompson
ATTORNEY.

No. 777,128. Patented December 13, 1904.

UNITED STATES PATENT OFFICE.

AUGUST NELSON, OF CHICAGO, ILLINOIS.

TRANSFER-TABLE.

SPECIFICATION forming part of Letters Patent No. 777,128, dated December 13, 1904.

Application filed March 9, 1904. Serial No. 197,363. (No model.)

*To all whom it may concern:*

Be it known that I, AUGUST NELSON, a citizen of the United States, residing at Chicago, in the county of Cook and State of Illinois, have invented a new and useful Improvement in Transfer-Tables, of which the following is a specification.

My invention has for its object to provide means for applying power to a transfer-table; and it consists of certain peculiarites of construction and combination of parts hereinafter described and subsequently claimed.

Referring to the drawings, Figure 1 is a top view of a transfer-table, showing the relation of my power appliance to the table. Fig. 2 is a sectional view on line $t\,t$ of Fig. 3, and Fig. 3 is a front view of my device applied to a truck.

Permanently secured to an axle B are car-wheels A and gear-wheels C, the latter meshing with other gear-wheels D, which in their turn are permanently secured to a driving or motor shaft E. I provide a motive power F, preferably an electric motor for driving shaft E, whereby the power is applied to both ends of the shaft at one time. Should I find that the casing around the motive power is insufficient to form a solid and substantial bearing for shaft E, I may employ bearings for journals H.

The table has secured to its lower face, as to the cross-beams clearly shown in Fig. 2 of the drawings, beams extending at right angles thereto, and to these beams I preferably secure the motor, as well as the hangers in which the axle B is journaled. This construction greatly simplifies matters, and, further, is practical and capable of serving all the functions assigned thereto.

While I have shown the transfer-table in Fig. 1 with operating-levers and the like, as shown in my application filed October 18, 1902, and allowed June 23, 1903, No. 731,806, and have shown my device as operated by an electric motor, I may, if I desire, without departing from the spirit of my invention, use air, steam, gas, or any other convenient means of applying power to my device.

Having thus described my invention, what I claim as new, and desire to secure by Letters Patent, is—

A transfer-table provided on its inner face with cross-beams, hangers secured thereto, an axle journaled in said hangers, car-wheels secured on the ends of said axle, opposing gear-wheels secured to the said axle, a motor secured to the said beams, and gear-wheels fixedly secured on the opposite ends of the shaft of said motor and meshing with said first-named gear-wheels.

In testimony whereof I have signed my name to this specification in the presence of two subscribing witnesses.

AUGUST NELSON.

Witnesses:
MAMIE BERRY,
L. A. THOMPSON.